United States Patent [19]
Bail et al.

[11] 4,001,824
[45] Jan. 4, 1977

[54] DME TIMING APPARATUS AND METHODS

[75] Inventors: John W. Bail, Fort Washington;
Ronald Lee Powell, King of Prussia;
Frank Patterson Smith, 2nd,
Dresher, all of Pa.

[73] Assignee: Narco Scientific Industries, Inc., Fort Washington, Pa.

[22] Filed: Apr. 28, 1975

[21] Appl. No.: 571,843

[52] U.S. Cl. ............................................. 343/7.3
[51] Int. Cl.² ........................................ G01S 9/56
[58] Field of Search ................................... 343/7.3

[56] References Cited
UNITED STATES PATENTS

| | | | |
|---|---|---|---|
| 3,781,888 | 12/1973 | Bail | 343/7.3 X |
| 3,889,260 | 6/1975 | Griffin | 343/7.3 |

Primary Examiner—T.H. Tubbesing
Attorney, Agent, or Firm—Paul & Paul

[57] ABSTRACT

A ranging timer allows decoded data pulses to toggle a flip flop, thereby initiating a transmission cycle. In a specific embodiment, the data pulses condition a second flip flop to energize the DME transceiver. During the next negative excursion of a 96 microsecond reference clock, the second flip flop is toggled, and during the next period of the reference clock, the decoder is disabled, the transmitter-modulator is energized, the ranging timer is enabled, and the first flip flop is reset. Since the time between the decoded data pulses is variable, jitter is built into the commencement of each transmission cycle.

11 Claims, 3 Drawing Figures

DME TIMING APPARATUS AND METHODS

BACKGROUND OF THE INVENTION

This invention relates to aircraft distance measuring equipment (DME), and more particularly to improvements in digital DME systems.

Conventionally, DME operation involves a transmission of a radio signal of specified character (typically, pulse pairs at approximately 30Hz) from an aircraft to a ground station. After specified delays and under known constraints at the ground station, a replay signal is radioed back to the aircraft. Once the return signal is identified, and known time delays are accounted for, the duration between transmission and reception is decoded to yield distance from the ground station to the aircraft. Many aircraft utilize the same ground stations at the same time, however, so the aircraft receiver must contain logic which speedily and reliably discriminates the response to its own transmitted signal from responses which are being sent out to the other aircraft.

It is a primary object of the present invention to provide DME timing methods and apparatus whereby the discrimination process is facilitated.

Since operational conditions at the ground station may vary considerably, it is desirable that the DME transceiver adapt its own transmission to the rate of receipt of the ground station. For example, the response efficiency of the ground station is affected directly by the number of aircraft with which it is presently communicating. Hence, some signals arriving during certain time periods simply will not be favored with a response. Further, DME ground stations have a built in preference for higher powered signals, thereby substantially impairing the response efficiency to the lower powered signals.

It is accordingly an object of the present invention to condition transmission of subsequent signals partially upon prior receipt of decoded signals from the ground station.

Another conventional aspect of DME ground stations is the generation of TACAN, or modulation of transmitted pulses onto a relatively low frequency envelope. In order to accentuate response efficiency, it is therefore desirable to avoid transmission during the relative null due to path loss of the ground station created when the envelope is at its minimum amplitudes.

It is accordingly a further object of the present invention that transmission be synchronized selectively with the receipt of signals from the ground station, thereby insuring subsequent transmission to the ground station during desirable time periods.

Finally, since many aircraft concurrently utilize the ground station, provision must be made so that the various aircraft DME's do not become synchronous with one another, thereby obviating the possibility of meaningful response from the ground station. To this end, a certain amount of jitter is provided, whereby successive aircraft transmission/reception cycles are slightly variable in time relative to each other. One way in which this was done in the prior art was to utilize the noise generated by a high voltage neon bulb, or the like.

It is an object of the present invention to provide timing apparatus and methods whereby the requisite jitter is provided.

SUMMARY OF THE INVENTION

The present invention involves logical apparatus and methods whereby subsequent DME transmission/reception cycles are keyed on receipt of prior decoded data, but the timing logic builds sufficient jitter into the cycles that the possibility of different aircraft being synchronized with one another is obviated. Hence, although the timing logic is energized by receipt of a valid data pulse, actual beginning of the next transmission cycle commences based on the occurrence of a select portion of a free running reference timing signal. The variability of duration between receipt of data pulses and the state transitions of the reference timing signal provides jitter, but all aspects of each individual transmission/reception cycle are synchronous with one another, such that the DME operation is unaffected by the jitter. Once each cycle begins, an internal 30Hz timer is reset, thereby establishing the overall average communication rate between aircraft and ground station.

In an illustrative embodiment, decoded data pulses toggle a first flip flop which is conditioned for commencement of a new transmission/reception cycle by the 30Hz timer. The output terminals of the first, or "jitter" flip flop, are coupled to the inputs of a second flip flop, which is toggled by a negative excursion of a local reference oscillator signal. The output of the second flip flop, together with the oscillator signal itself, temporarily disables the decoder, energizes the modulator and transmitter, and resets local distance measuring decoder. Further, the 30Hz timer is reset, and a synchronous reference is established for the transceiver based on the internal clock. Jitter is automatically established due to synchronizing to the first clock pulse after a random decoder output pulse. That is, jitter results both from time displacement of received pulses themselves, and from their occurrence relative to the internal clock. Hence, the foregoing objects of the present invention are substantially accomplished in an efficient and relatively simple mechanism.

DETAILED DESCRIPTION

Figure 1:
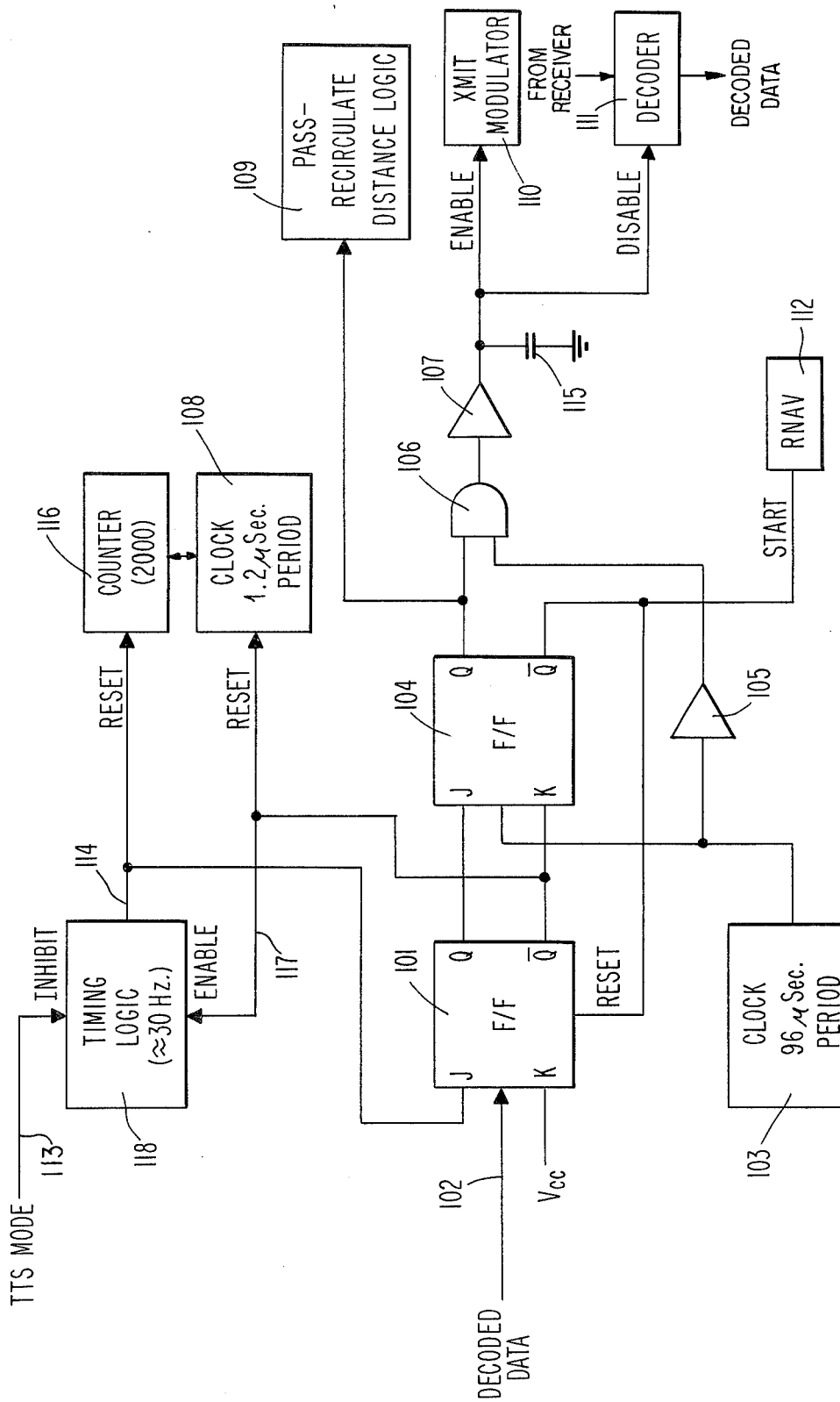
FIG. 1 shows in block diagrammatic form an illustrative embodiment of the principles of the present invention.

In the embodiment shown in FIG. 1, the basic transmit-receive cycle is regulated by timing logic 118 (sometimes also referred to herein as the PRF generator). This semirandom transmission interval is set at approximately 28 to 30Hz, and involves a limited amount of jitter. Basically, that jitter is built in due to the operation of a jitter delay flip flop 101 in conjunction with decoded data presented at 102 and a reference timing signal provided by the clock 103.

The reference timing clock 103, advantageously embodied as a crystal oscillator or other similarly precise and reliable apparatus, provides an ongoing real time reference for the DME transceiver. As shown, the clock advantageously utilizes a 96 microsecond periodicity, but it is to be understood that such timing specifications may be varied in accordance with the wishes of the designer.

The apparatus which is to be controlled and synchronized in accordance with the principles of the present invention is set forth in block diagrammatic form, and includes various transmission and modulation apparatus, decoder and distance measuring logic, an optional area navigation computer (RNAV), and the like. A more detailed disclosure of apparatus comprising a DME transceiver which advantageously may be controlled in accordance with the principles of the present invention is set forth in a publication entitled "Narco Avionics DME 190 Distance Measuring Equipment Maintenance Manual", which is available from Narco Avionics, Fort Washington, Pennsylvania, a division of the assignee hereof. The DME apparatus set forth herein is embodied in detail in that manual, and the system described therein advantageously utilizes the principles of the present invention. Hence, should detailed logic hookups and embodiments be desired, they may be had by reference thereto.

As set forth in FIG. 1, an illustrative DME transceiver involves a transmitter and modulator shown at 110, which are energized to transmit pulse pairs to the ground station at a semirandom interval approximately equal to 28 to 30Hz. A decoder 111 is provided for processing pulse pairs which are returned from the ground station; the decoder 111 therefore is to be disabled while the aircraft is transmitting. The system also involves a digital system for discriminating valid decoded pulses from other signals which are received, including pass-recirculate distance logic 109, and a 2,000 increment reference pulse counter 116. Further, a clock 108 having a 1,2 microsecond period (corresponding to the rate at which transmitted radio signals traverse each one-tenth nautical mile round trip between the aircraft and station) is provided in order to measure accurately the time between transmission and reception of clock pulses, and thereby to evaluate distance to station, velocity, time to station, and the like. An area navigation computer is represented at 112.

The embodiment set forth in FIG. 1 advantageously utilizes a type of flip flop which operates as follows. Each have two logical inputs, designated J and K, and two outputs designated Q and $\overline{Q}$, corresponding respectively to the J and K inputs. Generally speaking, the Q and $\overline{Q}$ terminals assume opposite logical states to one another, depending on the states of the J and K terminals, and upon receipt of clock pulses. If J and K are both logical 1's when the flip flop is clocked, the Q and $\overline{Q}$ outputs change to logical states opposite their prior states. If J and K both are logical 0's, no change occurs at Q and $\overline{Q}$ during clocking. If J is a logical 0 and K a logical 1 when the device is clocked, Q becomes logical 0 and $\overline{Q}$ logical 1, but if J is a logical 1 and K a logical 0, Q becomes logical 1 and $\overline{Q}$ becomes logical 0. Also, each flip flop is provided with a reset terminal, whereby upon receipt of a negative going pulse (i.e., logical 1 to logical 0), the output terminals are set at Q equals 0 and $\overline{Q}$ equal 1. Flip flops having the foregoing operational attributes are well known and commercially available.

At the start, it is assumed that flip flop 101 has been reset, and the output states are $Q = 0$, $\overline{Q} = 1$. The K input of flip flop 101 is always held at a logical 1 state, such that receipt of a decoded data pulse 102 directly or indirectly, as desired, from decoder 111 clocks the flip flop 101, at which time the output states of the flip flop depend on the status of the J input, which in turn is established by the timing logic 118. Hence, if the prescribed cycle to cycle timing interval has elapsed since the last transmission (e.g., approximately 33 milliseconds), the output terminal 114 of timing logic 118 becomes a logical 1, and the data pulse at 102 reverses the output states of flip flop 101, such that Q becomes a logical 1 and $\overline{Q}$ a logical 0. However, during the "no transmit" interval between cycles, when output terminal 114 of timing logic 118 is a logical 0, the output terminals would remain unchanged ($Q = 0$, $\overline{Q} = 1$) when a decoded data pulse is received at 102.

When the decoded data pulse flips the outputs of flip flop 101 to $Q = 1$, $\overline{Q} = 0$, the 1.2 microsecond clock 108 is stopped, and the timing logic 118 is reset. Also, the inputs of the second flip flop 104 are changed, with J becoming a logical 1 and K a logical 0. Hence, the next negative going excursion of the 96 microsecond clock 103 toggles the flip flop 104, and its Q output becomes a logical 1 and $\overline{Q}$ a logical 0. Flip flop 101 is thereby reset, with its output assuming the states of $Q = 0$, $\overline{Q} = 1$. The next negative going excursion of clock 103 thereby will reset flip flop 104 to its original position, with $Q = 0$, $\overline{Q} = 1$.

As flip flop 104 is toggled by clock 103 to an output state of $Q = 1$, $\overline{Q} = 0$, and flip flop 101 is thereby reset, the 1.2 microsecond distance increment clock 108 is energized, and thereafter is synchronized with the 96 microsecond reference clock 103. Simultaneously, the timing logic 118 is released to commence counting the next cycle to cycle interval.

Encoding and transmission takes place during the 96 microsecond interval after flip flop 104 is toggled by the reference clock 103. A negative going 96 microsecond pulse is established at the $\overline{Q}$ output of flip flop 104, which is fed to the RNAV computer 112 to be used as a start pulse. A positive going 96 microsecond pulse from the Q output of flip flop 104 is conveyed to the pass-recirculate distance logic 109, thereby triggering pass mode operation (see U.S. Pat. No. 3,781,888 to John Bail, which described a pass-recirculate system).

The 96 microsecond pulse at the Q terminal of flip flop 104 is used in conjunction with the 96 microsecond clock 103 itself to create two 48 microsecond periods for coding control. The Q output of flip flop 104 is coupled to a first input of AND gate 106, and the clock signal from 103 is inverted at 105 and coupled to the second input of AND gate 106. Hence, AND gate 106 is enabled for half of the period of the clock 103, when the clock output is negative and the output of integrator 105 is therefore positive, and is disabled for the other half period of clock 103. Since the negative going excursion of clock 103 toggles flip flop 104, AND gate 106 is enabled during the first 48 microseconds after toggling, and is disabled during the second 48 microseconds after toggling. Utilizing these 48 microsecond periods, the first 48 microsecond pulse serves to enable the encoder for transmission and modulation, 110, and simultaneously to disable the decoder 111. The second 48 microsecond half period is used to generate a dead time interval simulating the ground station dead time. The inverter 107 changes the polarity of signals from AND gate 106, and the capacitor 115 filters high frequency transients which otherwise might erroneously enable the decoder 111.

At this point, the various synchronizing operations have been performed, and the logic shown in FIG. 1 is conditioned for passage of the approximately 33 millisecond break provided by the timing logic 118, whereupon the J terminal of flip flop 101 is returned to a logical 1 state, and receipt of the next decoded data pulse at 102 is awaited. Hence, the operation provided is for transmission which is keyed upon prior receipt of decoded data, but each full transmit-receive cycle of which possesses a limited amount of jitter with respect to real time. Jitter is developed because the relative occurrence of a decoded data pulse at 102 and the next negative cycle of clock 103 may vary by the full duration of a cycle of the clock 103, and by time variation of data pulses.

Figure 2:
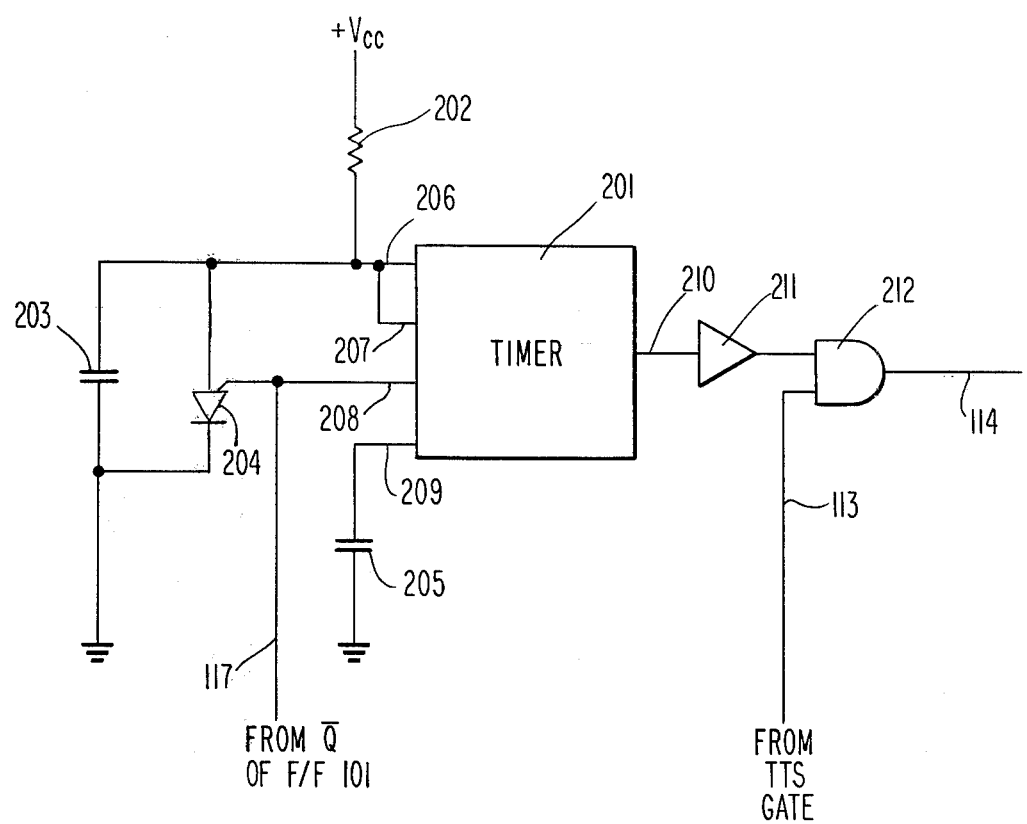
FIG. 2 shows an expansion of the timing logic of the FIG. 1 apparatus.

The operation of the timer 118 may be better understood upon consideration of a preferred configuration therefor, as set forth in FIG. 2. A capacitor 203 is charged through a resistor 202, and the voltage across capacitor 203 is coupled to the input terminals 206 and 207 of a timer 201. The time required to charge the capacitor 203, as sensed by the timer 201, dictates the transmission-reception cycle frequency of the transceiver. Advantageously, the timer 201 is embodied as a Signetics model NE555 timer unit, or equivalent apparatus, many of which are commercially available. Hence, the timer 201 produces a logical 0 output at terminal 210 when its input at terminals 206 and 207 is greater than or equal to a specified voltage (i.e., two-thirds $V_{cc}$), and is otherwise a logical 1. The dual input terminals 206 and 207 are a feature of the 555 timer whereby proper biasing may be utilized for multiple mode setups, but not relevant hereto. Also, capacitor 205 serves to by-pass a DC level adjustment facility at terminal 209. The timer 201 has a reset capability, at input terminal 208, whereby capacitor 203 is discharged upon receipt of a logical 0 signal, and terminal 210 thereby reverts to a logical 1 output. For purposes of discharging the voltage across capacitor 203, a means 204 (e.g., embodied as a unijunction device) is provided. Also, to assure complete discharge of the capacitor 203 by a logical 1 pulse from flip flop 101, device 204 is also forward biased thereby.

Thus, the timer circuitry of FIG. 2 establishes a logical 1 state at terminal 210 whenever the $\overline{Q}$ output terminal of flip flop 101 assumes a logical 0 state. At that time, capacitor 203 is discharged and begins to charge when $\overline{Q}$ goes to a logical 1. The magnitudes of resistor 202 and capacitor 203 determine the charging time, which advantageously is adjusted to approximately 33 milliseconds, thereby yielding an approximate periodicity of 30Hz for the timer 201. When the requisite voltage amplitude is reached at capacitor 203, output terminal 210 of timer 201 reverts to a logical 0 state, which is inverted at 211. This logical 1 state corresponds to passage of the requisite transmission/reception cycle to cycle interval, and the J input terminal of flip flop 101 may be switched to a logical 1 state.

An additional feature set forth in FIG. 2 is the facility to cease transmission when the time-to-station mode is being utilized. To this end, an AND gate 212 is provided, and when the time-to-station mode is utilized, a logical 0 is coupled to input terminal 113 of AND gate 212, thereby blocking the logical 1 from inverter 211. Otherwise, the output state of inverter 211 is coupled by a line 114 to the J input of flip flop 101. The same signal also resets a counter 116, which is utilized for purposes of distance computations, and which is subsequently re-energized by the 1.2 microsecond clock 108.

Figure 3:
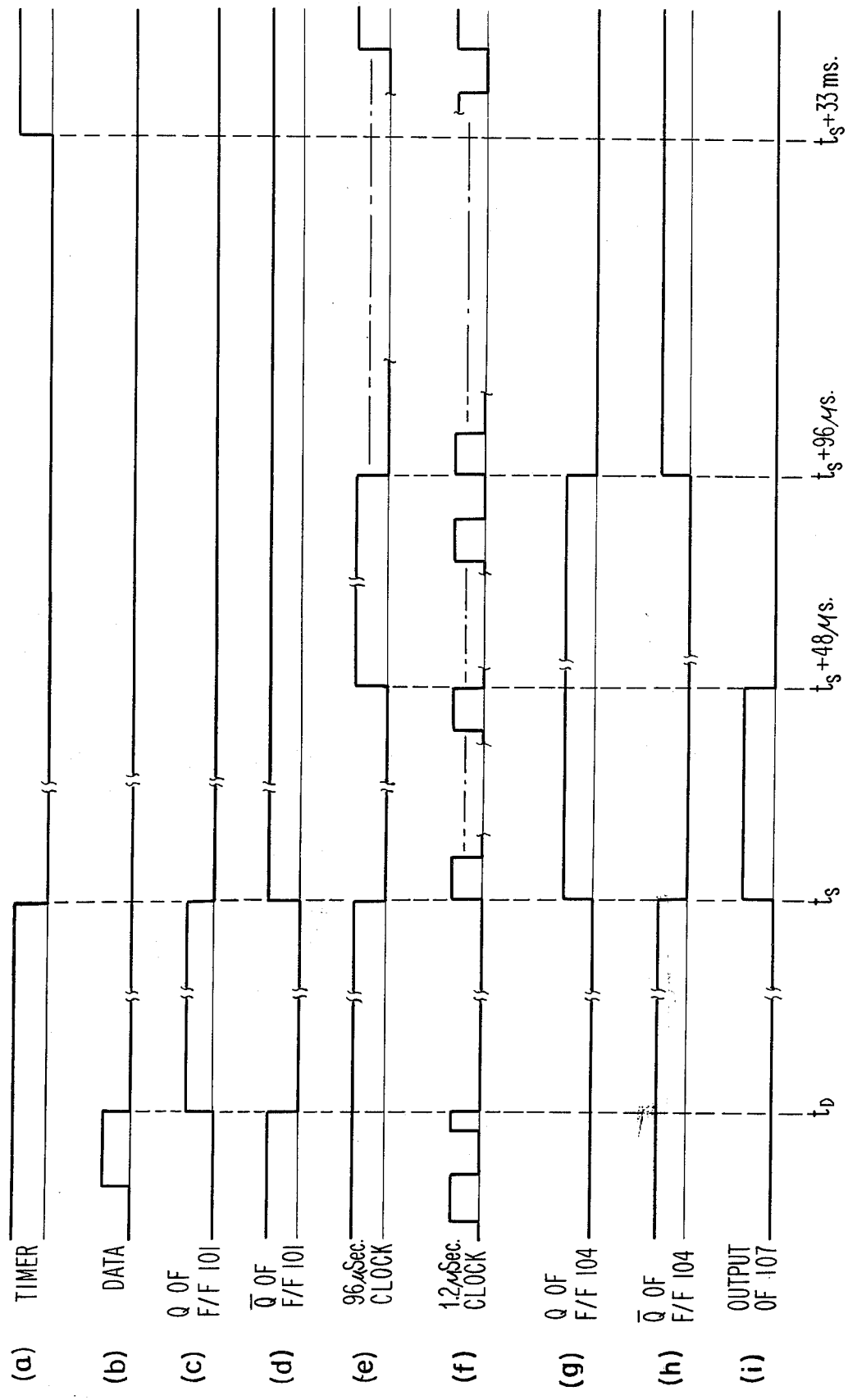
FIG. 3 shows timing wave forms which illustrate the operation of the embodiment of FIG. 1.

The overall operation of the embodiment of FIGS. 1 and 2 may be better understood upon consideration of waveforms (a) through (i) of FIG. 3. As set forth, the negative going portion of data pulse (waveform b) resets the timer 118 output (waveform a) and switches the outputs of flip flop 101 (waveform c). Also, the 1.2 microsecond clock is disabled (waveform f). This time is denominated $t_D$.

The next negative excursion of the 96 microsecond clock (waveform e), at time $t_s$, toggles the output terminals of flip flops 104 (waveforms g and h), which in turn resets flip flop 101, and thereby energizes the 1.2 microsecond clock (waveform f). The next positive excursion of the 96 microsecond clock, at time $t_s + 48$ microseconds, affords the 48 microsecond demarcation from inverter 107 (waveform i), and the following negative excursion of the 96 microsecond clock, at time $t_s + 96$ microseconds, toggles flip flop 104 back to its original state. Further change is inhibited until the timer (waveform a) output becomes a logical 1 once more, at $t_s + 33$ millisecs.

It is to be understood that the foregoing is presented as illustrative of the principles of the present invention, but numerous alternatives may occur to those of ordinary skill in the art. For example, the timing periods may be freely altered, and once the timing sequence is established, other DME circuity may be operated in synchronous fashion, as desired.

We claim:
1. In an airborne DME transceiver, timing apparatus comprising:
   a source of bipolar control signals having first and second output states, said first state occurring in response to a first energizing signal, said second state occurring automatically a fixed time after receipt of a second energizing signal;
   means for detecting the time of receipt of a decoded DME pulse from a DME ground station; and
   means, enabled by said first state and subsequent detection of a decoded DME pulse, and disabled by said second state, for respectively generating said first and second energizing signals, and for initiating a subsequent DME transission cycle.

2. In an airborne DME transceiver, timing apparatus comprising:
   a. a source of timing signals;
   b. means for detecting the time of receipt of a decoded pulse from a DME ground station;
   c. means, enabled by said timing signal and responsive to a decoded pulse, for energizing select apparatus within said transceiver;
   d. wherein said source of timing signals comprises a timer means for producing a first logical output state during a timing interval after being reset, and a second logical output state after said interval, said means for energizing resetting said timer means after energizing said select apparatus;
   e. wherein said means for energizing includes first bistable means having its input state determined by said timer means and being toggled by receipt of a data pulse;
      free running reference clock means; and
      second bistable means having its input state conditioned by said first bistable means; said clock means being coupled to toggle said second bistable means.

3. In a DME transceiver a timing method comprising the steps of:

inhibiting a subsequent transmission cycle for a predetermined duration after a previous transmission cycle;
enabling said subsequent cycle after said duration;
detecting the time of occurrence, after said enabling, of receipt of a decoded pulse; and
energizing select apparatus in said DME transceiver in response to said detecting step.

4. A method as described in claim 3 and further including providing a reference timing signal, wherein said energizing step is further conditioned on occurrence of a specified portion of said reference timing signal after said detecting step.

5. In an airborne DME transceiver, timing apparatus comprising:
a source of a timing reference signal;
means for detecting the time of receipt of a decoded pulse from a DME ground station;
means, responsive to a select portion of said timing signal next subsequent to detection of a decoded pulse, for enabling operation of said transceiver synchronous with said timing reference signal and for conditioning said means for detecting not to respond to detected decoded pulses during a predetermined duration after said enabling.

6. Apparatus as described in claim 5 and further including timer means, operable at a predetermined pulse rate, said timer means being disabled upon detection of said time of receipt of a decoded pulse, and subsequently being energized synchronously with said reference signal by said means for enabling simultaneously with said conditioning.

7. Apparatus as described in claim 5 wherein said means for enabling comprises:

bistable means responsive to said reference signal and to said means for detecting; and
logic means for enabling transmission of signals to said ground station and fo simultaneously disabling receipt of pulses from said ground station for a predetermined time.

8. Apparatus as described in claim 5 wherein said means for detecting comprises first bistable means responsive to said decoded data, and to said means for enabling.

9. Apparatus as described in claim 8 wherein said means for enabling comprises second bistable means responsive to the output of said first bistable means and to said timing reference signals.

10. In a DME transceiver, a timing method comprising the steps of:
establishing an operational state a predetermined time after transmission by said transceiver;
detecting the time of receipt of a decoded data signal;
providing a local reference timing signal;
energizing synchronous operation of said transeeciver upon next occurrence of said reference timing signal after detection of a decoded signal; and
inhibiting said operational state for said predetermined period.

11. A method as described in claim 10 wherein said energizing step includes:
enabling a second local clock signal synchronous with said timing reference signal;
temporarily inhibiting decoding operation of the transceiver; and
enabling transmission of further signals from said transceiver to the ground station.

* * * * *